(12) United States Patent
Homa et al.

(10) Patent No.: US 10,967,564 B2
(45) Date of Patent: Apr. 6, 2021

(54) METHOD FOR THE LAYERED CONSTRUCTION OF A SHAPED BODY

(71) Applicant: Lithoz GmbH, Vienna (AT)

(72) Inventors: Johannes Homa, Großpetersdorf (AT); Johannes Patzer, Klosterneuburg (AT); Rafael Reiter, Vienna (AT); Manfred Spitzbart, Vienna (AT)

(73) Assignee: Lithoz GmbH, Vienna (AT)

( * ) Notice: Subject to any disclaimer, the term of this patent is extended or adjusted under 35 U.S.C. 154(b) by 165 days.

(21) Appl. No.: 15/563,449

(22) PCT Filed: Mar. 30, 2016

(86) PCT No.: PCT/AT2016/000032
§ 371 (c)(1),
(2) Date: Sep. 29, 2017

(87) PCT Pub. No.: WO2016/154645
PCT Pub. Date: Oct. 6, 2016

(65) Prior Publication Data
US 2018/0117835 A1     May 3, 2018

(30) Foreign Application Priority Data

Apr. 2, 2015   (AT) .................................. A 205/2015

(51) Int. Cl.
*B29C 64/129*     (2017.01)
*B33Y 10/00*      (2015.01)
(Continued)

(52) U.S. Cl.
CPC .......... *B29C 64/129* (2017.08); *B29C 64/135* (2017.08); *B29C 64/386* (2017.08);
(Continued)

(58) Field of Classification Search
None
See application file for complete search history.

(56) References Cited

U.S. PATENT DOCUMENTS

| 5,321,622 A | 6/1994 | Snead et al. |
| 2011/0310370 A1 | 12/2011 | Rohner et al. |

(Continued)

FOREIGN PATENT DOCUMENTS

| EP | 0354637 A2 | 2/1990 |
| EP | 2505341 A1 | 10/2012 |

(Continued)

OTHER PUBLICATIONS

International Search Report for PCT/AT2016/000032 mailed Jul. 01, 2016; English translation submitted herewith (6 Sages)_ X.

(Continued)

*Primary Examiner* — Peter L Vajda
*Assistant Examiner* — Adrianna N Konves
(74) *Attorney, Agent, or Firm* — Fitch, Even, Tabin & Flannery, LLP (57) ABSTRACT

A method for the layered construction of a shaped body of highly viscous photopolymerizable material, includes forming layers of the shaped body one after the other and one on top of the other by each forming a material layer of predetermined thickness (a) of the highly viscous photopolymerizable material in a tank, lowering a construction platform, or the shaped body at least partially formed on the construction platform, into the material layer so as to cause a layer of the highly viscous photopolymerizable material to form between the construction platform or the shaped body and the tank bottom, curing such layer in a position-selective manner, in particular by irradiation through the tank bottom, to provide the desired shape of the shaped body layer, wherein the thickness (a) of the material layer is varied at least once during the layered construction of the shaped body.

17 Claims, 5 Drawing Sheets

(51) Int. Cl.
*B33Y 50/02* (2015.01)
*B29C 64/386* (2017.01)
*B33Y 30/00* (2015.01)
*B29C 64/135* (2017.01)

(52) U.S. Cl.
CPC ............... *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2012/0248657 A1* | 10/2012 | Ebert | B29C 64/20 264/401 |
| 2013/0337100 A1 | 12/2013 | Costabeber | |
| 2014/0191442 A1 | 7/2014 | Elsey | |
| 2016/0288412 A1* | 10/2016 | Stampfl | B33Y 10/00 |

FOREIGN PATENT DOCUMENTS

| | | |
|---|---|---|
| WO | 2010/045950 A1 | 4/2010 |
| WO | 2012/143785 A1 | 10/2012 |
| WO | 2013/026087 A1 | 2/2013 |

OTHER PUBLICATIONS

Written Opinion of the International Search Authority, dated Oct. 6, 2016, German language submitted herewith (6 pages) for PCT/AT2016/000032.

* cited by examiner

Fig. 1

Prior Art

Fig. 2

Prior Art

Fig. 3

Prior Art

METHOD FOR THE LAYERED CONSTRUCTION OF A SHAPED BODY

CROSS-REFERENCE TO RELATED APPLICATIONS

This application is a U.S. national phase application filed under 35 U.S.C. § 371 of International Application No. PCT/AT2016/000032, filed Mar. 30, 2016, designating the United States, and claims priority from Austrian Patent Application No. A 205/2015, filed Apr. 2, 2015, and the complete disclosures of which applications are hereby incorporated herein by reference in their entirety for all purposes.

The invention relates to a method for the layered construction of a shaped body of highly viscous photopolymerizable material, in particular a resin with a ceramic filler, where layers of said shaped body are formed one after the other and one on top of the other by each forming a material layer of predetermined thickness of the highly viscous photopolymerizable material in a tank and lowering the construction platform, or the shaped body at least partially formed on the construction platform, into the material layer so as to cause a layer of the highly viscous photopolymerizable material to form between the construction platform or shaped body and the tank bottom, which layer is cured in a position-selective manner, in particular by irradiation through the tank bottom, to provide the desired shape of the shaped body layer.

The invention further relates to a device for carrying out the method according to the invention.

A method and a device of the initially defined kind are described in WO 2010/045950 A1 and in EP 2505341 A1. That method serves for the layered construction of a shaped body by applying lithography-based generative manufacturing, e.g. rapid prototyping. Therein, a defined layer of a photopolymerizable material provided in a tank with a horizontal bottom designed to be translucent at least in partial areas is formed in the following manner. A vertically controlledly movable construction platform is carried by a lifting mechanism and disposed on the tank so as to be vertically liftable and lowerable by the lifting mechanism under the control of a control unit. By lowering the construction platform into the photopolymerizable material provided in the tank, material is forced out of the space between the lower side of the construction platform and the tank bottom. By precisely adjusting the vertical position of the construction platform, a layer of photopolymerizable material can thus be produced with a precisely defined layer thickness between the lower side of the construction platform and the tank bottom. The thus defined layer of photopolymerizable material is then exposed by position-selective exposure from below through the translucent tank bottom in the desired geometry to thereby cure the layer on the construction platform. After this, the construction platform with the first layer cured thereon is lifted, and photopolymerizable material is fed into the exposed region. These steps are repeated in order to construct the shaped body of consecutive layers, the layer of photopolymerizable material yet being defined by the unfinished shaped body rather than by the construction platform.

The above-described method is, in particular, suitable for processing photopolymerizable material having a high viscosity. A high viscosity of the material is, for instance, encountered in ceramic-filled material. The high viscosity of the photopolymerizable material in lithography-based generative manufacturing involves a considerable deterioration of workability. If, in the context of the present invention, it is referred to highly viscous material, this, in particular, encompasses a viscosity of at least 10 Pa·s.

One of the problems involved in the use of highly viscous material resides in the formation of gas bubbles, in particular air bubbles, in the material. The formation of air or gas bubbles in the photopolymerizable material may occur in several ways in the course of the construction process; on the one hand, by the inclusion of gas immediately before the exposure, while the construction platform and the unfinished shaped body are immersed into the material surface, and, on the other hand, by the formation of foam when removing the exposed shaped body layer from the tank bottom. Gas bubbles in the material are manifested as gas inclusions in the green body and constitute defects to be avoided in the component structure, which may lead to the formation of cracks during discharging and sintering, and to failures of the component during application (e.g. with ceramic components).

It is, therefore, the object of the present invention to improve a method and a device of the initially defined kind such that the gas inclusions in the photopolymerizable material are effectively removed from the area to be exposed, or are prevented from forming from the very beginning.

To solve this object, the invention in a method of the initially defined kind essentially provides that the thickness of the material layer is varied at least once during the construction of the shaped body.

The invention is based on the finding that, during lowering of the construction platform or the unfinished shaped body into the material layer, a material flow is created, which laterally presses out of the gap between the construction platform or unfinished shaped body and the tank bottom not only material but also entrapped gas bubbles. The larger the lowering path of the construction platform or unfinished shaped body is selected in the material, the more material will be forced out of said gap, and along with it the entrapped gas bubbles. The lowering path will be the longer the larger the material layer thickness is chosen. It is thus possible, by increasing the material layer thickness, to significantly reduce the number of air bubbles in the surface to be exposed. However, this technique involves an increase in the process time and a reduction of the material quality by an increased volume being affected by scattered light.

According to the invention, it is, therefore, provided that the material layer thickness, i.e. the filling level of the material in the tank, is varied at least once during the construction of the shaped body. The layer-dependent variation of the material layer thickness preferably is aimed to minimize the material layer thickness required for the formation of the respective shaped body layer, i.e. to choose it just large enough in order that the material flow generated by the immersion of the construction platform or unfinished shaped body into the material will be sufficient to force the gas bubbles out of the area to be exposed.

The at least one-time variation of the material layer thickness during the construction process in this respect means that the material layer thickness is a function of the number of the shaped body layer, which means that the material layer thickness for the formation of at least one first shaped body layer is chosen to be different from the material layer thickness for the formation of at least one further shaped body layer. It is preferably provided that the material layer thickness is varied several times during the construction process. A mode of operation in which the material layer thickness is newly calculated for the production of each shaped body layer is particularly preferred.

In a preferred manner, the material layer has the same thickness at every point. The surface of the material layer is thus level, extending in parallel with the tank bottom. In this case, the material layer thickness is defined as the distance, measured at a right angle to the tank bottom, between the tank bottom and the surface of the material layer. However, where the material layer is unevenly thick, the material layer thickness is defined as the distance between the tank bottom and the highest point of the material layer, measured at a right angle to the tank bottom.

The determination of the material layer thickness that is optimal for the formation of the respective shaped body layer is preferably performed by considering the geometry of the preceding shaped body layer. The necessary material layer thickness can, in particular, be estimated by determining the geometrically induced material flow and the geometrically induced path lengths of possibly present bubbles, usually by an associated calculation unit. If edges or irregularities occur in the tank, from which air bubbles are hard to remove, the material layer thickness will preferably also be increased in a suitable manner.

The geometric characteristic to be considered in the determination of the respective material layer thickness in a simple manner may comprise the surface area of the preceding shaped body layer. The method in this case is performed such that the material layer thickness is varied as a function of the surface area of the immediately preceding shaped body layer. In doing so, the material layer thickness is chosen to be larger the larger the surface area of the immediately preceding shaped body layer, since the displacement path length of bubbles increases with an increasing surface area. In a further embodiment of the method according to the invention, the material layer thickness is a function of the surface area of the current layer and the surface area of the previously formed layer.

Alternatively or additionally, other geometric characteristics of the preceding shaped body layer may also be used as a basis for determining the current material layer thickness. Geometric characteristics may, for instance, comprise the presence of recesses and the like in the preceding shaped body layer.

In general, it may preferably be proceeded such that the material layer thickness is varied as a function of a calculated value of the displacement path length of bubbles forming on the interface between the construction platform, or the shaped body, and the highly viscous photopolymerizable material.

In order to form the individual layers for the shaped body layers to be produced one after the other, it is preferably proceeded such that the construction platform, after the curing step, is lifted and again lowered into the tank for the formation of the next shaped body layer after having fed material below the lifted construction platform to form the material layer.

The feeding of material in this context is preferably performed by the distribution of material using a doctor blade, wherein the layer thickness of the material layer is adjusted by adjusting the distance between the lower edge of the doctor blade and the tank bottom.

As already mentioned, gas bubbles are, in particular, formed during the immersion of the construction platform or unfinished shaped body into the material layer, on the interface between the construction platform or shaped body and the highly viscous photopolymerizable material. In an advantageous further development of the method according to the invention, the site of the first contact of the descending construction platform, or descending shaped body, with the material layer is selectively influenced. According to the invention, this can be accomplished in that at least one material layer has a layer thickness variation in the lateral direction. This means that the material layer does not have the same layer thickness everywhere, but in at least one partial region is designed to be thicker than in another partial region. The construction platform, or the unfinished shaped body formed thereon, is thus caused to initially contact the material layer in that region in which the layer thickness is the largest. This may be a point-shaped, line-shaped or two-dimensionally extending surface area. It is possible to provide just one region of the material layer with a layer thickness larger than that of the remaining regions, or two or several regions with layer thicknesses larger than those of the remaining regions.

The lateral thickness variation of the material layer can be realized in various ways. It is, in particular, possible to provide a thickness variation in just one lateral extension, or in two lateral extensions transverse to each other. It is preferably provided that the at least one material layer comprises a ramp-shaped region. The ramp shape is an exemplary embodiment in which the layer thickness is varied in just one dimension, i.e. in a lateral direction. Alternatively, the at least one material layer may comprise a conical region. The conical shape is an exemplary embodiment in which the layer thickness is varied in two dimensions, i.e. in the x- and y-directions in a Cartesian coordinate system with a layer thickness defined in the z-direction.

In another embodiment comprising a position-dependent material layer thickness, i.e. a laterally varying material height within a layer, the layer thickness is increased relative to the remaining layer on sites on which potential bubbles with large displacement path lengths are formed, in order to provide an enhanced material flow locally.

In a further embodiment comprising a position-dependent material layer thickness, the material surface is significantly uneven in order to favorably define the contact points and minimize the number of contact points entrapping bubbles.

In a further embodiment comprising a position-dependent material layer thickness, material is approximately applied only on sites to be exposed, in order to minimize the impairment of the material by scattered light.

In order to produce a material layer thickness with lateral thickness variation, an adjustable element or an adjustable tank is preferred, which apply the material as a function of the lateral position prior to the exposure of the shaped body layer.

In the context of the present invention, the lateral variation of the layer thickness is provided in addition to the layer-dependent variation of the material layer thickness according to the invention. In the layer-dependent variation of the material layer thickness, the thickness of the material layer is varied at least once during the construction of the shaped body.

According to a further aspect of the invention, a device for carrying out the method according to the invention is provided, comprising
  a tank with a bottom translucent at least in some areas, into which highly viscous photopolymerizable material can be filled,
  a doctor blade held at an adjustable height above the tank bottom for the formation of a material layer on the tank bottom, wherein an adjustment unit is provided for adjusting said height,
  a construction platform held at an adjustable height above the tank bottom, an irradiation unit actuatable for the position-selective irradiation of a shaped body layer formed between the lower side of the construction platform and the tank bottom, an electronic memory for a virtual, three-dimensional model of the shaped body layers and the shaped body constructed thereof, a control unit, to which the virtual model of the shaped body layers is supplied and which is configured to polymerize in consecutive irradiation steps superimposed shaped body layers on the construction platform each with a predetermined geometry by controlling the irradiation unit, and to calculate as a function of the geometry of the respective shaped body layer a set value for the material layer thickness, and to generate a control signal for the adjustment unit associated with the doctor blade in order to adjust the material layer thickness according to the set value.

In the following, the invention will be explained in more detail by way of exemplary embodiments schematically illustrated in the drawing. Therein.

Figure 1:
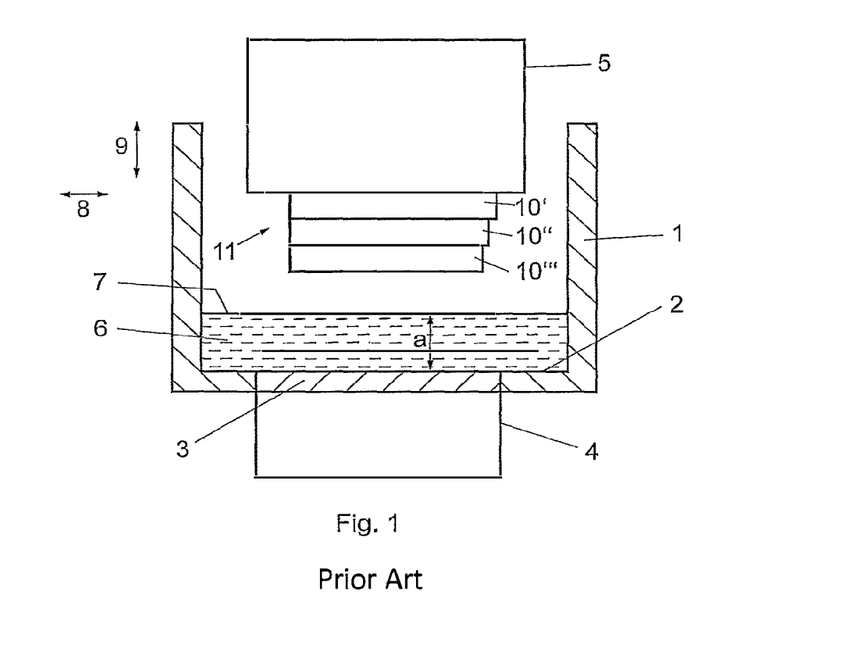
FIGS. 1 to 3 are sectional views of a device for the layered construction of a shaped body in consecutive phases of the process sequence.

At first, the mode of functioning of a device for implementing a method according to the present invention is described with reference to FIGS. 1 to 3, which illustrate a device already known per se from EP 2505341 A1. The device, which is located in air or any other gas atmosphere, comprises a tank 1 whose tank bottom 2 is transparent or translucent at least in a partial region 3. This partial region 3 of the tank bottom 2 at least covers the extension of an exposure unit 4 disposed below the tank bottom 2. The exposure unit 4 comprises a light source (not illustrated) and a light modulator through which the intensity can be controlled, and position-selectively adjusted, by a control unit in order to generate on the tank bottom 2 an exposure field having the geometry desired for the layer to be formed at the moment. Alternatively, a laser may be used in the exposure unit, the light beam of which laser will scan the exposure field with the desired intensity pattern via a movable mirror controlled by a control unit.

Opposite the exposure unit 4, a construction platform 5 is provided above the tank 1, which is carried by a lifting mechanism (not illustrated) so as to be held above the tank bottom 2 in the region above the exposure unit 4 in a height-adjustable manner. The construction platform 5 may also be transparent or translucent.

In the tank 1 is a bath of highly viscous material 6. The material level 7 of the bath is defined by a suitable element such as a doctor blade, which applies the material uniformly on the tank bottom 2 at a defined material layer thickness a. The trough 1 may, for instance, be associated with a guide rail, on which a carriage is movably guided in the sense of double arrow 8. A drive ensures the reciprocating movement of the carriage, which comprises a mount for a doctor blade. Said mount, for instance, comprises a guide and an adjustment device for vertically adjusting the doctor blade in the sense of double arrow 9. Thus, the distance of the lower edge of the doctor blade to the bottom 2 of the tank 1 can be adjusted. The doctor blade is used when the construction platform is in the lifted state as illustrated in FIG. 1, and serves to uniformly distribute the material 6 upon adjustment of a pregiven layer thickness. The layer thickness of the material 6 resulting from the material distribution process is defined by the distance of the lower edge of the doctor blade from the bottom 2 of the tank 1.

Figure 2:
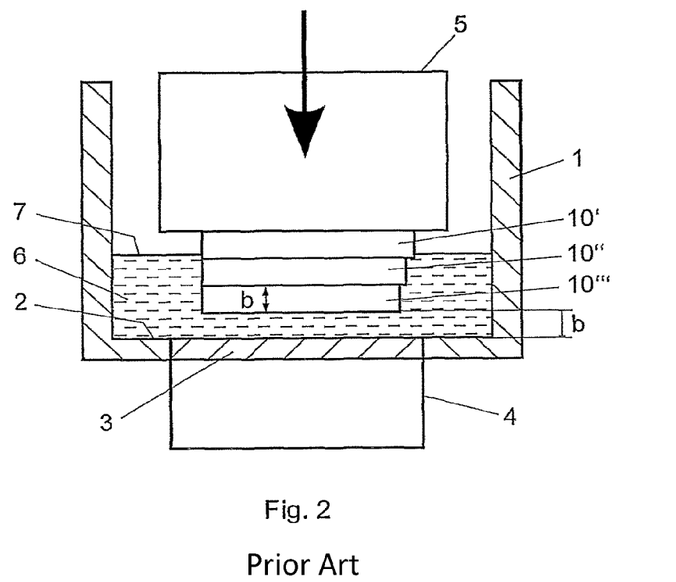
Figure 3:
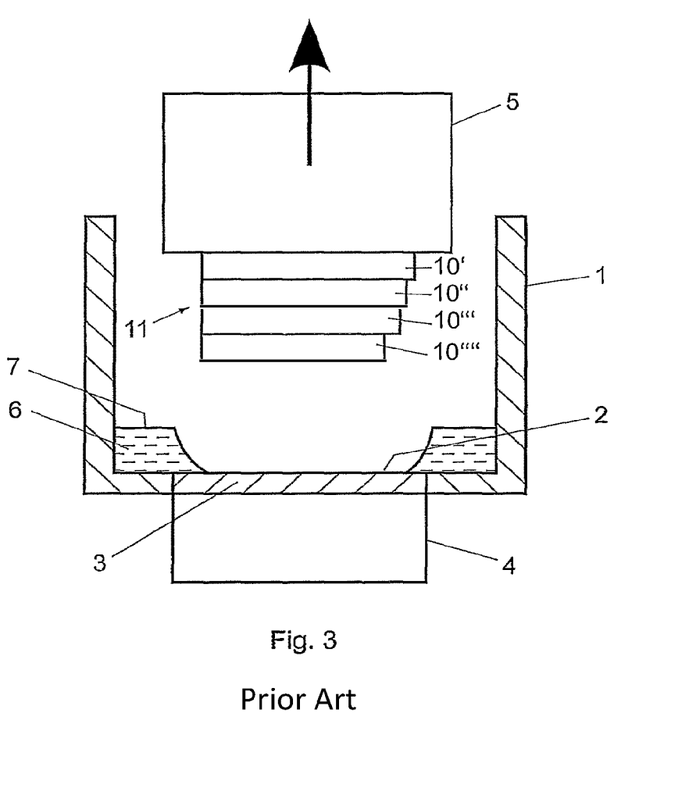
Figure 4A:
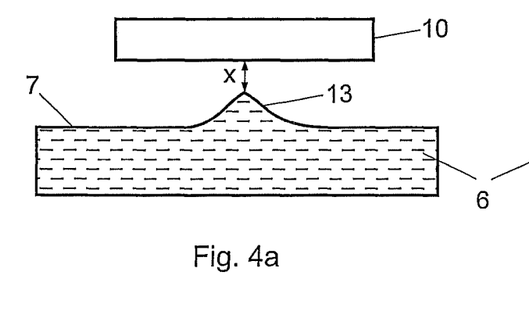
FIG. 4 illustrates the behavior of the photopolymerizable material during the immersion of the construction platform, or the unfinished shaped body.
Figure 4B:
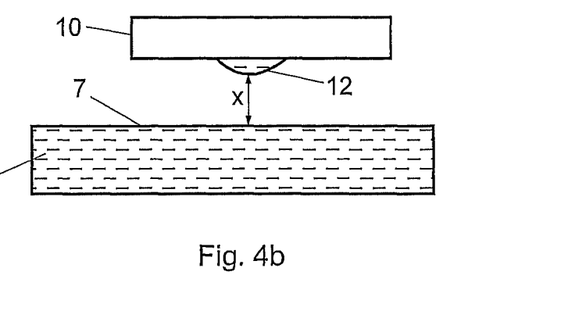
Figure 4C:
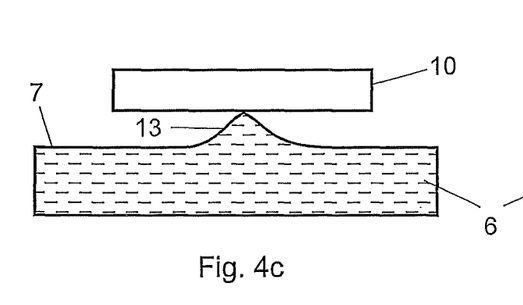
Figure 4D:
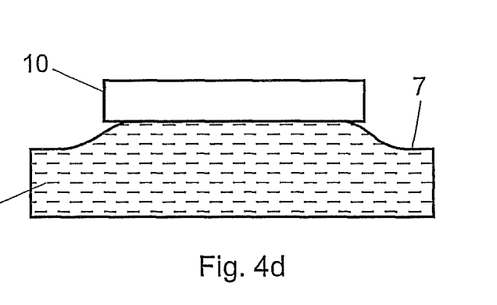

The thus formed material layer thickness a is larger than the layer thickness b of the shaped body (FIG. 2). For defining a layer of photopolymerizable material, it is proceeded in the following manner. The construction platform 5, on which shaped body layers 10', 10" and 10''' have already been formed, is lowered by the lifting mechanism in a controlled manner as illustrated in FIG. 2 such that the lower side of the lowermost shaped body layer 10''' initially contacts the surface of the material bath 6 with height a, is then immersed and approaches the tank bottom 2 to such an extent that exactly the desired shaped body layer thickness b will remain between the lower side of the lowermost shaped body layer 10''' and the tank bottom 2. During this immersion process, photopolymerizable material is forced out of the space between the lower side of the construction platform 5 and the tank bottom 2. As soon as the shaped body layer thickness b has been adjusted, the position-selective exposure specific for this shaped body layer takes place in order to cure the shaped body layer 10'''' in the desired shape. After the formation of the shaped body layer 10'''', the construction platform 5 is lifted again by the lifting mechanism, thus providing the state shown in FIG. 3. The photopolymerizable material 6 is no longer present in the exposed region.

These steps are subsequently repeated several times in order to obtain additional shaped body layers 10 of photopolymerizable material. The distance of the lower side of the last-formed shaped body layer 10 to the tank bottom 2 is adjusted to the desired shaped body layer thickness b and, after this, the photopolymerizable material is position-selectively cured in the desired manner.

In the course of the construction process, air bubbles may form in the photopolymerizable material in various ways, which are described below with reference to FIG. 4.

The first chance of air bubbles forming is during the contact of the material bath 6 with the construction platform 5 or lowermost shaped body layer 10 (in the following referred to as "contacting"), as will be explained with reference to FIG. 4. Contacting initially takes place not on the entire surface of the lowermost shaped body layer 10, but only at point 13 (in the following referred to as "contact point") of the shortest distance x between the lowermost shaped body layer 10 and the material surface 7. The procedure of contacting is determined by undesired irregularities in the material surface (FIG. 4*a*) and in the construction platform 5 or the lowermost shaped body layer 10 (FIG. 4*b*), in the latter case, in particular, by non-cured material 12 adhering to the lower side of the last-exposed shaped body layer 10 during the lifting of the construction platform 5. With the construction platform 5 lowered, the contact point 13 rapidly increases (FIG. 4*c*) to a contact surface (FIG. 4*d*), because the surfaces are pulled together and the point increases to a surface due to adhesion forces and surface tension between the material and the construction platform 5, or the lowermost shaped body layer 10.

Figure 5A:
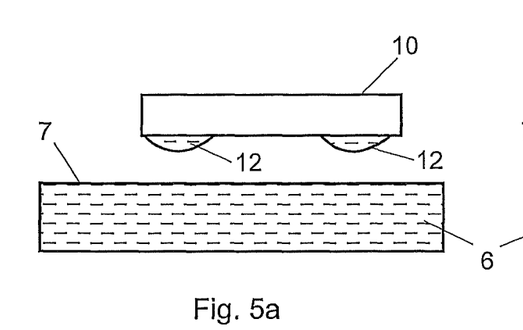
FIG. 5 illustrates the inclusion of an air bubble during the immersion process.
Figure 5B:
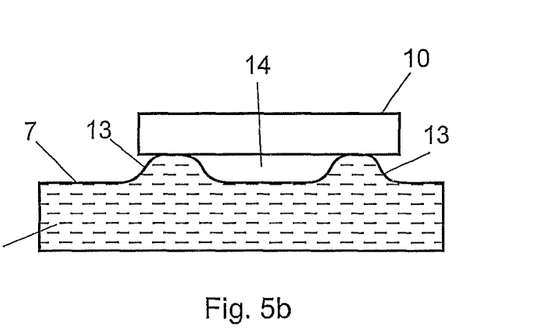
Figure 5C:
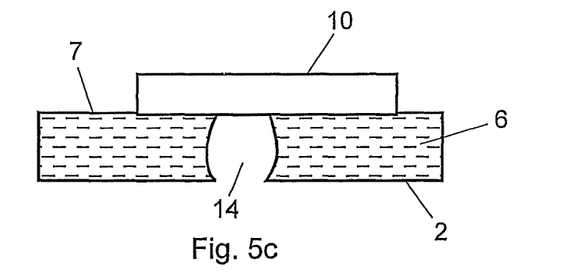

During this process, contacting and contact surfaces may also occur on other sites. In unfavorable cases, air or gas bubbles are being entrapped as several contact surfaces are growing together. This case is depicted in FIG. 5, wherein a two-dimensional system is assumed for the sake of simplicity without loss of generality. FIG. 5*a* shows the last-formed shaped body layer 10 of the unfinished shaped body 11, to which non-cured material 12 adheres, and the material 6 present in the tank 1. The non-cured material 12 forms two contact points 13 at the same time (FIG. 5*b*), thus causing a gas bubble 14 to be entrapped. With the construction platform 5 being further lowered (FIG. 5*c*), the gas bubble is also urged downwardly, thus contacting both the tank bottom 2 and the construction platform 5, or the lowermost shaped body layer 10.

The larger the component surface the higher the number of inclusions, since every contact surface has a limited extension, outside of which new contact points can form any time during further lowering of the component.

Especially with the first shaped body layer 10', inclusions of air or gas bubbles very frequently occur, since the entire construction platform 5, which usually exceeds the shaped body layers 10 in terms of surface area, is immersed into the photopolymerizable material 6 and the likelihood of several contact points increases.

The second chance for the formation of air bubbles takes place during lifting. During the detachment of the exposed layer from the tank bottom 2, foam formation will occur, in particular with complex layers (i.e. layers comprising many recesses and hence many edges).

The likelihood of air inclusions will be reduced if the construction platform 5, or the lowermost shaped body layer 10, and the surface 7 of the material 6 are not parallel when contacting each other, whereby the control of the positions of the contact points and the onset of their formation will be substantially enhanced. This can be implemented in various configurations, e.g. by a tank 1, or construction platform 5, that is adjustable in terms of angle, height or shape. In a preferred embodiment of the invention, this is, however, achieved by an oblique or uneven material surface 7, which is mechanically simpler to realize and offers more options, e.g. a corrugated surface 7 or an inclined surface 7. The appropriate selection of a material surface 7 will enable a single contact point to successively propagate over the entire component surface with no other contact point forming.

Figure 6A:
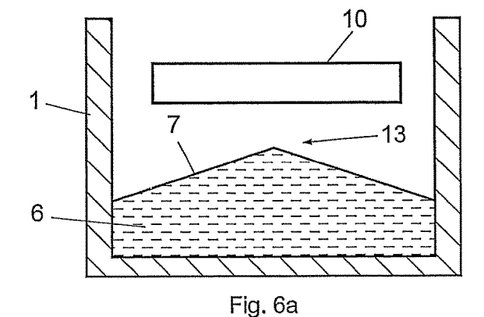
FIG. 6 illustrates the use of a lateral variation of the material layer thickness for defining contact points minimizing the number of contact points entrapping bubbles.
Figure 6B:
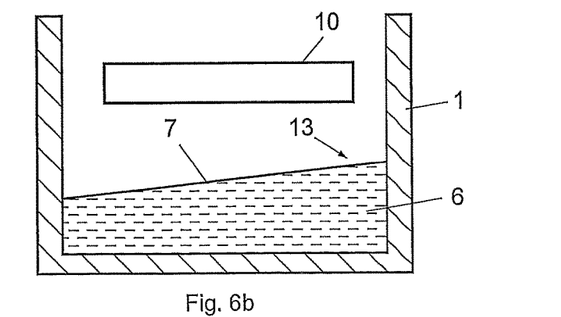

FIG. 6*a* depicts a configuration comprising such a material layer 6 whose layer thickness a varies in a position-dependent manner or in the lateral direction. In this specific case, the material surface 7 forms an inclined plane, thus causing the first contact point 13 to form at the highest point of the inclined plane, said first contact point 13 successively propagating over the component surface. FIG. 6*b* depicts an analogous configuration, in which the material surface is pyramid-shaped or conical.

The air bubbles forming during contacting of the material bath 6 by the construction platform 5, or the lowermost shaped body layer 10 can be removed by partially pressing out the material 6 below the construction platform 5 or lowermost shaped body layer 10, respectively, which will be described below with reference to FIG. 7. The lowermost shaped body layer 10 contacts the material as the construction platform 5 is lowered to height a and exerts a force on the material 6 therebelow during further lowering to the shaped body layer thickness b, thus causing the material to be laterally pressed out of the gap 15 between the lowermost shaped body layer 10 and the tank body 2. If air bubbles 14 are contained in the material, they will be taken along by the material flow.

Figure 7A:
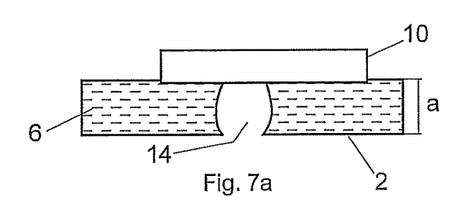
FIG. 7 illustrates the displacement process of material and a gas bubble.
Figure 7B:
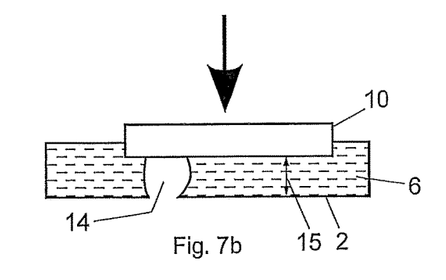
Figure 7C:
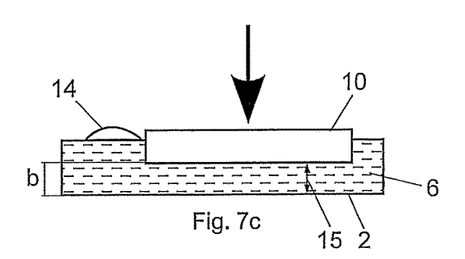

From FIG. 7*a*, it is apparent that an air bubble 14 was entrapped. The material flow entrains the bubble 14 to the component edge (FIG. 7*b*), where it ascends to the material surface 7 (FIG. 7*c*), being no longer in the region to be exposed.

Figure 8A:
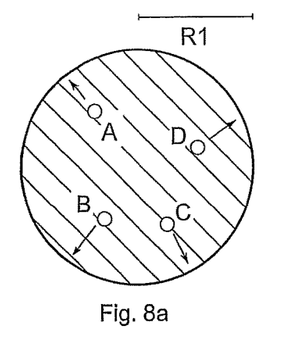
FIG. 8 depicts different path lengths of air bubbles as a function of their positions.
Figure 8B:
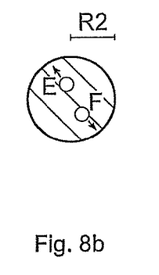

With the surface of the last-formed layer growing, the number of air bubbles 14 rises, but the amount of material in gap 15 and hence also the material flow will increase proportionally thereto. At the same time, the path length to be covered by an air bubble 14 as far as to the outermost edge of the component 11 will also increase, and thus the likelihood of the air bubble being completely forced out of the gap 15 between the component 11 and the tank bottom 2 will decrease. FIG. 8*a* depicts a shaped body layer of a cylindrical shaped body 11, in particular a circle having radius R1. The arrows indicate the different path lengths to be covered by a bubble 14 forming at points A, B, C or D. Compared to this, bubbles E and F (FIG. 8*b*), which may form in a cylindrical shaped body having radius R2, which is smaller than R1, have smaller path lengths, thus also requiring a smaller material layer thickness for providing an adequate flow.

Figure 9:
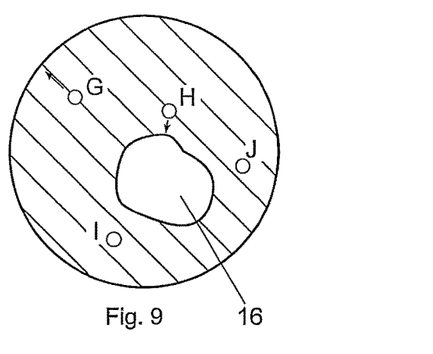
FIG. 9 depicts different path lengths for a layer geometry including recesses.

If the layers constructed immediately before the current shaped body layer comprise recesses 16, a material flow into these recesses 16 can also occur as illustrated in FIG. 9 (points G and H and the associated path lengths indicated by respective arrows). The average path length of the air bubbles 14 is thereby reduced. At the same time, the material flow towards the outside (i.e. away from the component) is thus not unambiguously defined, which may cause spots without material flow in the gap between the lowermost shaped body layer 10 and the tank bottom 2, where air bubbles 14 will persevere (points I, J), and a generally deteriorated material flow. Thus, the geometry of the component can both positively and negatively influence the removal of air bubbles 14 by material displacement.

Furthermore, recesses will also render the removal of air bubbles 14 difficult because of the fact that, due to surface tensions, an air bubble 14 will only detach under the influence of force from an edge on the component 11 defining a recess 16.

The amount of material pressed out, or pressed into holes 16 provided in the lowermost shaped body layer 10, and the material flow will disappear when choosing the layer thickness a of the material layer 6 and the layer thickness b of the shaped body layer such that a=b and will increase with an increasing material layer thickness a. An increase in the material layer thickness a will thus ensure a reduced amount of air bubbles 14 after the lowering of the construction platform 5.

Especially with highly viscous (e.g. ceramic-filled) photopolymerizable material and small shaped body layer thicknesses (b<100 µm), the lowering of the construction platform 5, or the unfinished shaped body 11, can only be performed slowly with high material layer thicknesses a, since the material 6 must be given sufficient time to flow out of the gap 15 between the construction platform 5, or lowermost shaped body layer 10, and the tank bottom 2. This latency time will rise with an increasing material layer thickness a, leading to a significant extension of the overall process time.

Furthermore, a deterioration of the precision and quality of a component is to be observed with a high material layer thickness a. On the one hand, a higher portion of material is subject to scattered light and other adverse influences, which will deteriorate its quality. On the other hand, the material exerts a higher force on the unfinished shaped body 11 during its displacement, which may lead to a (temporary) deformation of the component 11 and deficiencies in the layer height. For the photopolymerizable resin comprising the filler $Al_2O_3$, it has been demonstrated that, at a fixed shaped body layer thickness b of 25 µm, the following values for the material layer thickness a are advantageous:

a=100 µm for a component diameter d=0.5 mm,
a=250 µm for a component diameter d=4 mm, and
a=400 µm for a component diameter d=8 mm.

As a rule, attempts have been made to keep the material layer thickness a as small as possible for the above-mentioned reasons. In conventional methods for the layered construction of a shaped body, the material layer thickness a is determined once and left the same over the entire construction process of the respective shaped body.

By contrast, it is provided according to the invention that the material layer thickness a is adjusted at least once during the construction process, in particular with a view to optimizing the displacement of the bubbles while simultaneously minimizing the layer thickness in order to avoid, as far as possible, the above-mentioned drawbacks of large layer thicknesses. It is preferably provided that an optimal layer thickness a of the material layer 6 is newly determined for each shaped body layer to be exposed, so that the material flow forming during the immersion of the component 11 into the material 6 will be sufficient to ensure the displacement of gas bubbles 14 from the region to be exposed. The material layer thickness a is thus a function of the layer number n: a=f(n).

Figure 10A:
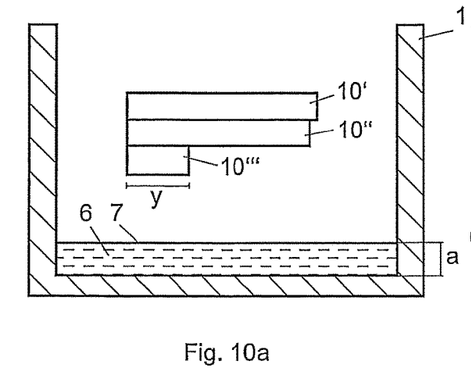
FIG. 10 illustrates the use of different material layer thicknesses for minimizing the material amount used for displacing the gas bubbles.
Figure 10B:
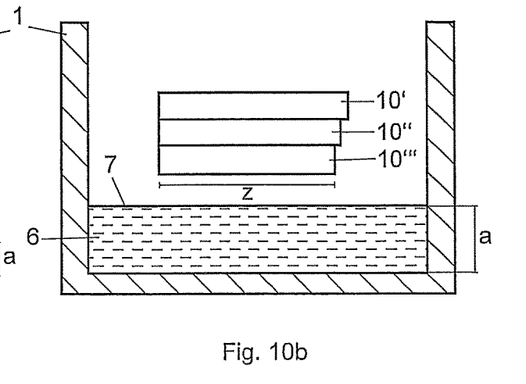

In FIG. 10a (small material layer thickness a) and in FIG. 10b (larger material layer thickness a), two cases are compared. The last-produced shaped body layer 10''' has a small surface area (extension y) in FIG. 10a and a large surface area (extension z) in FIG. 10b. According to the invention, it thus applies for the material layer thickness a that the latter can be chosen to be smaller in the case of FIG. 10a than in the case of FIG. 10b in order to provide the flow necessary for displacing the bubbles.

The required material layer thickness is preferably estimated by determining the geometrically induced material flow and the geometrically induced path lengths of possibly present bubbles, usually by an associated calculation unit.

If edges are formed in the unfinished shaped body 11 or irregularities are created in the tank 1, from which air bubbles 14 are hard to remove, the material layer thickness a will preferably be increased.

Figure 11:
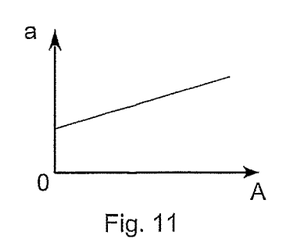
FIG. 11 shows the linear correlation between layer surface and material layer thickness.

In one embodiment, the material layer thickness a is a function of the surface area of the previously formed shaped body layer n, wherein n represents a variable for the layer number. FIG. 11 depicts a preferred linear correlation between the surface area A of the preceding shaped body layer and the material layer thickness a.

In further embodiments, the material layer thickness a(n) for a given layer n is not constant, but laterally position-dependent, i.e. a(n,x,y). This may have various positive effects as will be explained below.

Figure 12:
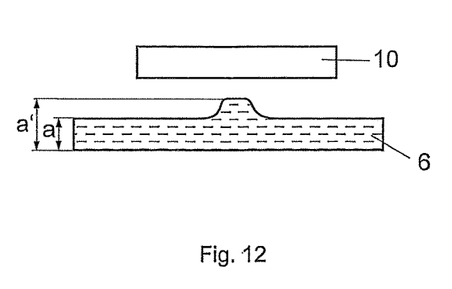
FIG. 12 illustrates the use of different material layer thicknesses for increasing the material flow on sites with possible gas inclusions having long path lengths.

In an embodiment with a position-dependent material layer thickness a(n,x,y), the material layer thickness a on sites on which bubbles with large displacement path lengths are possibly formed is increased relative to the remaining material layer 6 in order to provide a higher material flow locally. FIG. 12 depicts a material layer thickness a' increased in the center of a circular material layer 6.

In a further embodiment comprising a position-dependent material layer thickness a(n,x,y), the material surface is significantly uneven in order to define contact points and minimize the number of contact points 13 entrapping bubbles 14. FIG. 6a depicts a configuration with a position-dependent material layer thickness a, in which the material surface 7 forms an inclined plane and the first contact point 13 is thus formed at the highest point of the inclined plane, gradually propagating over the component surface. FIG. 6b illustrates an analogous configuration, in which the material surface is pyramid-shaped or conical.

Figure 13:
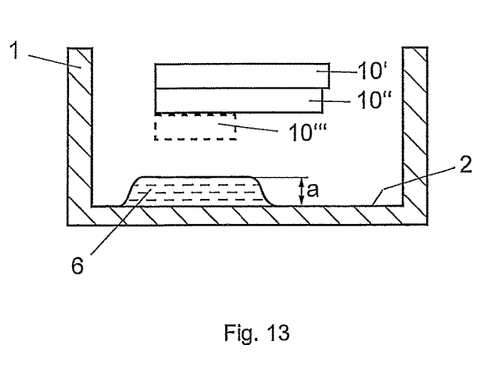
FIG. 13 illustrates the use of a material layer thickness varied in a position-dependent manner for reducing the material present in the tank.

In a further embodiment with a position-dependent material layer thickness a(n,x,y), material is substantially only applied to sites to be exposed, in order to minimize any impairment of the material by scattered light. In FIG. 13, the next layer 10''' to be exposed and the material layer 6 approximately present in this region are illustrated.

In order to produce the material layer thickness a(x,y,n), an adjustable element such as a doctor blade or an adjustable tank 1 is preferred to apply the material prior to the exposure of the shaped body layer n.

The invention claimed is:

1. A method for the layered construction of a shaped body of highly viscous photopolymerizable material, where each of the layers of the shaped body are formed one after the other and one on top of the other, by forming a material layer of predetermined initial thickness (a) of the highly viscous photopolymerizable material in a tank and lowering a construction platform, or the shaped body at least partially formed on the construction platform, into the material layer so as to cause a layer of the highly viscous photopolymerizable material having a final thickness (b) to form between the construction platform or the at least partially formed shaped body and the tank bottom, which layer is cured in a position-selective manner to provide the desired shape of the shaped body layer, wherein the initial thickness (a) of the material layer is varied prior to lowering the construction platform during the construction of the shaped body and wherein the predetermined initial thickness (a) is not the same for every layer being formed during the construction of the shaped body.

2. A method according to claim 1, wherein the construction platform after the curing step is lifted and again lowered into the tank for the formation of the next shaped body layer after having fed material below the lifted construction platform to form the material layer.

3. A method according to claim 2, wherein the method includes feeding the highly viscous photopolymerizable material to the tank and distributing the material using a doctor blade having a lower edge, and adjusting the initial thickness (a) of the material layer by adjusting the distance between the lower edge of the doctor blade and the tank bottom.

4. A method according to claim 1, wherein at least one material layer comprises an initial layer thickness variation in the lateral direction.

5. A method according to claim 4, wherein the thickness variation is provided in just one lateral extension, or in two lateral extensions transverse to each other.

6. A method according to claim 4, wherein the at least one material layer having the initial thickness variation in the lateral direction comprises a ramp-shaped region.

7. A method according to claim 4, wherein the at least one material layer having the initial thickness variation in the lateral direction comprises a conical region.

8. A method according to claim 1, wherein the method further comprises, after the curing step in forming a layer, forming a succeeding layer of the shaped body by
(i) lifting the construction platform,
(ii) feeding highly viscous photopolymerizable material below the lifted construction platform to form a new material layer, wherein in the feeding includes distributing the highly viscous photopolymerizable material using a doctor blade, and adjusting the initial layer thickness (a) of the new material layer by adjusting the distance between the lower edge of the doctor blade and the tank bottom,
(iii) lowering the construction platform into the new material layer in the tank, and
(iv) curing the material layer in a position-selective manner to provide the desired shape of the succeeding layer of the shaped body.

9. A method according to claim 8, wherein the method comprises forming each succeeding layer of the shaped body by repeating sequentially (i), (ii), (iii) and (iv).

10. A method according to claim 8, wherein said method curing the material layer in a position selective matter comprises irradiating the material layer formed between the lower side of the construction platform and the tank.

11. A method according to claim 1, wherein said highly viscous photopolymerizable material comprises a resin with a ceramic filler.

12. A method according to claim 1, wherein curing the layer in a position-selective manner comprises irradiating, through the tank bottom, the material layer formed between the lower side of the construction platform or the shaped body at least partially formed on the construction platform and the tank bottom, to provide the desired shape of that layer of the shaped body.

13. A method according to claim 1, wherein the initial thickness (a) is greater than the final thickness (b).

14. A method according to claim 1, wherein the initial thickness (a) for a given layer is not constant throughout the layer.

15. A method for the layered construction of a shaped body formed from highly viscous photopolymerizable material comprised of a resin with a ceramic filler, wherein the shaped body is comprised of layers which are formed one after the other and one on top of the other, said method comprising
(i) forming a material layer of predetermined initial thickness (a) of the highly viscous photopolymerizable material in a tank that has a bottom that is translucent at least in one region,
(ii) lowering a construction platform, or an at least partially shaped body formed on a construction platform, into the material layer so as to cause a layer of the highly viscous photopolymerizable material having a final thickness (b) to form between the construction platform or shaped body at least partially formed on the construction platform and the tank bottom, wherein the lowering includes adjusting the distance from the underside of the construction platform or the last-formed layer of the shaped body to the bottom of the tank to obtain the final thickness (b), and wherein the underside of the construction platform, or the at least partially shaped body on the construction platform, and the surface of the material layer in the tank are not parallel when contacting each other,
(iii) curing the layer of the highly viscous photopolymerizable material formed between the construction platform or shaped body on the construction platform and the tank bottom in a position-selective manner by irradiation through the at least one translucent region of the tank bottom, to provide the desired shape of the shaped body layer, and, before forming the next layer,
(iv) lifting the construction platform, and
(v) forming each a subsequent layer of the shaped body by repeating (i), (ii) and (iii), and then (iv), until the last layer of the shaped body is formed,
wherein, during the layered construction of the shaped body, in forming at least one material layer of a predetermined initial thickness (a), the filling level of the highly viscous photopolymerizable material in the tank is varied for that material layer, whereby the predetermined initial thickness (a) is not the same for every layer being formed during the construction of the shaped body, and wherein the predetermined initial thickness (a) in at least one of the material layers is varied prior to lowering the construction platform in (ii).

16. A method for the layered construction of a shaped body of highly viscous photopolymerizable material according to claim 15, wherein in forming a subsequent layer the method comprises, after (iv), feeding highly viscous photopolymerizable material below the lifted construction platform to form a new material layer having its initial predetermined layer thickness (a), and wherein the feeding includes distributing the highly viscous photopolymerizable material using a doctor blade having a lower edge, and adjusting the initial layer thickness (a) for the subsequent layer by adjusting the distance between the lower edge of the doctor blade and the tank bottom.

17. A method for the layered construction of a shaped body formed from highly viscous photopolymerizable material comprised of a resin with a ceramic filler, wherein the shaped body is comprised of layers which are formed one after the other and one on top of the other, said method comprising
(i) feeding the highly viscous photopolymerizable material in a tank that has a bottom that is translucent at least in one region to a fill level of the highly viscous photopolymerizable material,
(ii) forming a material layer of predetermined initial thickness (a) in the tank, said forming including adjusting the distribution of the highly viscous photopolymerizable material in the tank to obtain the predetermined initial layer thickness (a) of the material layer;
(iii) lowering a construction platform, or an at least partially shaped body formed on a construction platform, into the material layer having the predetermined initial thickness (a) so as to cause a layer of the highly viscous photopolymerizable material having a final thickness (b) to form between the construction platform or shaped body at least partially formed on the construction platform and the tank bottom, wherein the lowering includes adjusting the distance from the underside of the construction platform or the last-formed layer of the shaped body to the bottom of the tank to obtain the final thickness (b), (iv) curing the layer of the highly viscous photopolymerizable material formed between the construction platform or shaped body on the construction platform and the tank bottom in a position-selective manner by irradiation through the at least one translucent region of the tank bottom, to provide the desired shape of the shaped body layer, and, before forming the next layer,
(v) lifting the construction platform, and
(vi) forming each a subsequent layer of the shaped body by repeating (i), (ii), (iii), (iv) and then (v), until the last layer of the shaped body is formed,
wherein, during the layered construction of the shaped body, in forming at least one material layer of a predetermined initial thickness (a), the fill level of the highly viscous photopolymerizable material in the tank is varied for that material layer, and wherein the predetermined initial thickness (a) is not the same for every layer being formed during the construction of the shaped body.

* * * * *